Aug. 3, 1954  K. M. FEIERTAG  2,685,658
DYNAMOELECTRIC MACHINE
Filed Nov. 5, 1952
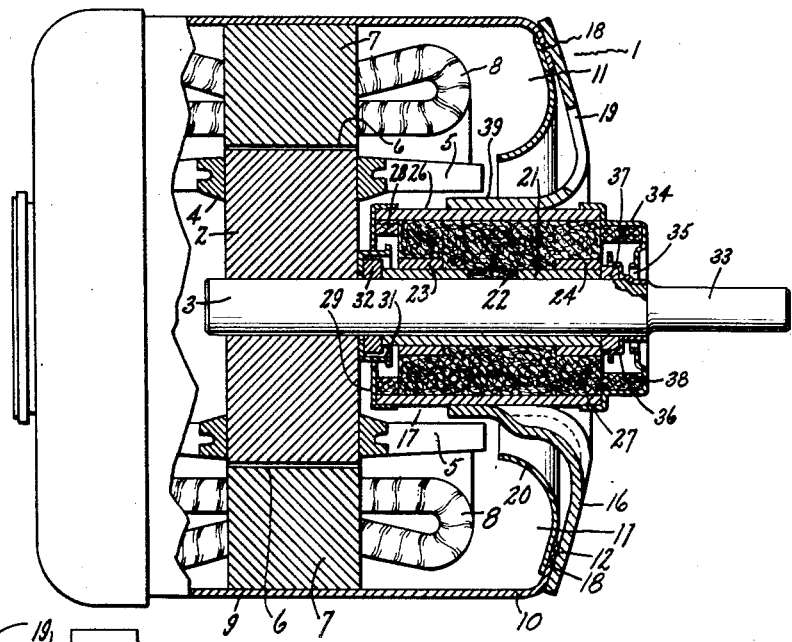
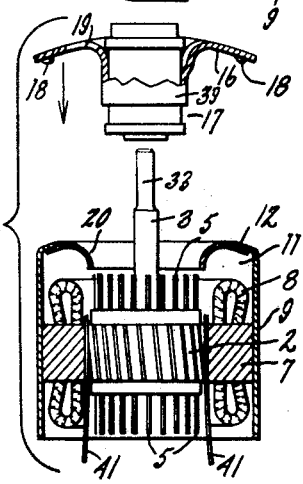
Inventor
Karl M. Feiertag
by Robert G. Iris
His Attorney Patented Aug. 3, 1954

2,685,658

UNITED STATES PATENT OFFICE 2,685,658

DYNAMOELECTRIC MACHINE

Karl M. Feiertag, Fort Wayne, Ind., assignor to General Electric Company, a corporation of New York Application November 5, 1952, Serial No. 318,836

12 Claims. (Cl. 310—90)

This invention relates to dynamoelectric machines, and more particularly to the mechanical assembly of shell, end shield, and bearing members.

In the design of dynamoelectric machines, particularly in the fractional horsepower frame sizes, it is desirable that perfect alignment of the rotor within the stator bore be secured during assembly without the necessity for providing rabbets, gauging, etc. It is further desirable that these machines be designed for economical manufacture and assembly with a minimum of complicated and expensive machine tools and equipment.

It is therefore an object of this invention to provide an improved dynamoelectric machine construction characterized by the provision of perfect alignment of the rotor within the stator bore during assembly.

Another object of this invention is to provide an improved bearing construction.

Further objects and advantages of this invention will become apparent and the invention will be better understood by reference to the following description and the accompanying drawing, and the features of a novelty which characterize this invention will be pointed out with particularity in the claims annexed to and forming a part of this specification.

In accordance with this invention, there is provided a dynamoelectric machine having a rotor member mounted on a shaft and positioned within the bore of a stator member mounted in turn within a shell member. The shell member has an inwardly turned flange formed at one end thereof, this flange preferably having a frusto-spherical configuration with its radius extending from a point along the center line of the shaft. An end shield member is provided having a hub portion formed thereon and also preferably being spherical in configuration with the same radius as that of the flange. A bearing is secured in the hub of the end shield member and rotatably supports a shaft. The outer periphery of the end shield member is secured to the flange of the shell member, as by projection welding, and it will be readily apparent that the position of the end shield member with respect to the flange can be adjusted prior to welding to secure perfect alignment of the rotor within the stator bore.

In the drawing, Fig. 1 is a side elevational view, partly in section, illustrating the improved dynamoelectric machine construction of this invention;

Fig. 2 is a fragmentary view in perspective, partly broken away, illustrating the improved end shield and bearing construction of Fig. 1;

Fig. 3 is a side elevational view, partly in section, illustrating the assembly of the machine of Fig. 1; and Fig. 4 is another side elevational view, partly in section, illustrating the spherical configuration of the shell flange and the end shield member of the machine of Fig. 1.

Referring now to Fig. 1, there is shown a unit bearing dynamoelectric machine generally identified as 1 having a rotor member 2 mounted on a shaft 3. The machine 1 is shown as being an induction motor and thus rotor 2 is provided with suitable squirrel cage bars (not shown) having end rings 4 and integrally formed fan blades 5. Rotor 2 is positioned within the bore 6 of stator member 7, preferably formed of a plurality of relatively thin laminations of magnetic material and having a plurality of winding slots (not shown) in which suitable windings 8 are positioned. The stator member 7 is suitably secured within cylindrical shell member 9 formed of suitable material, such as sheet steel.

Shell member 9 has an extension portion 10 extending beyond rotor member 2 and stator member 7 and defining an end cavity 11 in which windings 8 and fan blades 5 are arranged. An inwardly turned flange 12 is formed on the end of the extended portion 10 of shell 9, the flange 12 preferably being frusto-spherical in configuration, as shown in Fig. 4, with its radius 13 extending from a point 14 along the center line 15 of the shaft 3. It will be seen from the above that flange 12 will have an arcuate cross section for any section taken on a plane passing through the axis of shaft 3. It is further preferable that the point 14 be on the side of the rotor member 2 and stator member 7 remote from the cavity 11. It will be readily apparent that the cylindrical shell 9 is in the form of an open bottom cup which may be drawn, or in the alternative rolled up from flat sheet stock and then welded into a cylinder with one end being formed to conform to the radius 13. As an additional alternative, shell 9 may be formed of a preformed steel tube with one end formed to provide the frusto-spherical flange 12.

An end shield member 16 is provided formed of suitable material such as sheet steel and having a hub portion 39 extending into the end cavity 11. End shield member 16 is also preferably spherical in configuration with its radius being the same as the radius of the flange 12 of shell 9, as shown in Fig. 4. It will be seen that this construction will cause flange 12 and end shield member 16 to have parallel surfaces when both are positioned about shaft 3 as shown. A suitable bearing assembly 17 is mounted within the hub portion 39 of end shield 16 so as to be substantially integral with the hub portion of end shield 16 and rotatably supports shaft 3, as will be hereinafter more fully described. End shield member 16 has its outer periphery secured to flange 12 of shell 9 in any suitable manner, as by projection welding at 18, the manner of assembly to provide for perfect alignment of rotor 2 within the bore 6 of stator 7 being hereinafter described in connection with Fig. 3. End shield member 16 is provided with a plurality of openings 19 communicating with end cavity 11 for admitting ventilating air to the interior of the machine and a suitable baffle member 20 is secured to the inner surface of flange 12 of shell 9 in any suitable manner, as by projection or spot welding.

Referring now to Fig. 2 in addition to Fig. 1, bearing assembly 17 includes an inner bearing sleeve 21, preferably a babbitt lined steel sleeve, having an opening 22 formed in its periphery communicating with the journal surface of shaft 3. A pair of cylindrical members 23 and 24 respectively embrace bearing sleeve 21 adjacent its ends and are each provided with a plurality of radially outward extending spokes or projections 25. An outer casing 26 is arranged over the spokes 25 of members 23 and 24 and is in turn secured within hub portion 39 of end shield 16. It will be readily apparent that members 23 and 24 may be formed of suitable extruded materials, such as aluminum. Suitable lubricant absorbent material 27 is arranged within the cavity 40 defined by the outer casing 26 and the inner bearing sleeve 21 filling the same and extending into the spaces between the spokes 25 of members 23 and 24 and into opening 22 in bearing sleeve 21 to contact the journal surface of shaft 3. Outer casing 26 extends beyond member 23 toward rotor 2 and a suitable ring 28 of absorbent material is arranged therein. A cup-shaped enclosure member 29 is assembled over the end of casing 26 adjacent rotor 2 and has an opening 30 formed therein through which lubricant slinging device 31, which is secured to shaft 3, extends. A thrust washer 32 is positioned within the lubricant slinger 31 and abutting the end of inner bearing sleeve 21. At the shaft extension end 33 of the machine, another cup shaped member 34 is assembled over outer casing 26 and is provided with opening 35 through which shaft extension 33 projects. Another lubricant slinging device 36 is arranged on shaft 3 adjacent to shaft extension 33 with thrust washer 37 being interposed between the thrust washer 36 and the end of inner bearing sleeve 21. A ring of suitable lubricant absorbent material 38 is arranged within the member 34.

It will now be seen that lubricant may be introduced to the cavity 40 saturating the lubricant absorbent material 27 and that this lubricant is fed to the journal surface of the shaft 3 through the opening 22. As this lubricant proceeds through the clearance between the journal surface of the shaft 3 and the bearing surface of bearing sleeve 21 to the two ends of the bearing, it is picked up by lubricant slinging devices 31 and 36 and respectively thrown centrifugally into lubricant absorbent rings 28 and 38 which in turn feed the lubricant back into the main body of lubricant absorbent material 27.

In the assembly of the machine of Fig. 1, as shown in Fig. 3, baffle member 20 is first secured to the inner surface of flange 12 in any suitable manner, as by spot welding, and the stator member 7 with its windings 8 in place therein is then positioned in the shell member 9 and secured thereto in any suitable manner. In the meantime, bearing assembly 17 is positioned in hub portion 39 of end shield member 16 and secured therein in any suitable manner. Rotor member 2 is then positioned in the bore 5 of stator member 7 with a plurality of shims 41 of suitable width being inserted in the bore to provide a uniform air gap distance, i. e., perfect alignment of the rotor member 2 within the stator 7. Bearing assembly 17 is then positioned on shaft 3 with end shield 16 ultimately contacting the outer surface of flange 12. The outer periphery of end shield 16 is then secured to the outer surface of flange member 12 of shell 9 in a suitable manner, as by projection welding. It will now be readily seen that the positioning of end shield member 16 with respect to flange 12 is determined by the location of rotor 2, shaft 3, and bearing assembly 17. After end shield 16 has been secured to flange 12 of shell 9, shims 41 may be removed and it will be seen that thereafter rotor 2 is perfectly aligned within bore 5 of stator 7. The spherical configuration of flange 12 and end shield member 16 permits flange 16 to assume any position with respect to flange 12 required by the location of shaft 3 and bearing assembly 17.

While a unit bearing motor has been shown, it will be readily apparent that the construction shown in Fig. 1 could equally be used in a machine having two bearings. In this case, one end shield would be assembled on the machine as shown in Fig. 3, the shims 41 would then be removed, and the other end shield would then be assembled in the same manner. While the projection welding of the end shield 16 to the flange 12 of shell member 9 does not permit ready disassembly, it will be readily apparent that disassembly could be provided by substituting screws for the projection welds and by providing sufficient clearance in the screw holes in flange 17 to permit adjustment of the end shield 16 to secure the necessary alignment of rotor 2. It will also be readily apparent that a bearing construction other than the assembly 17 may be utilized without departing from the spirit of this invention.

While I have shown and described a particular embodiment of this invention, further modifications and improvements will occur to those skilled in the art. I desire that it be understood therefore that this invention is not limited to the form shown and I intend in the appended claims to cover all modifications which do not depart from the spirit and scope of this invention.

What I claim as new and desire to secure by Letters Patent of the United States is:

1. A dynamoelectric machine comprising a rotor member mounted on a shaft, a stator member mounted within a shell member, said shell member having an inwardly turned arcuate flange formed at one end thereof, and an end shield member for said machine having a bearing secured thereto rotatably seating said shaft, said end shield member extending parallel to and being secured to said flange.

2. A dynamoelectric machine comprising a rotor member mounted on a shaft, a stator member mounted within a cylindrical shell member, said shell member having a portion extending beyond said rotor and stator members defining an end cavity, said shell member portion having an inwardly turned arcuate flange formed at its end, an end shield member for said machine having a hub portion formed thereon extending into said cavity, said end shield member having its outer periphery parallel to and secured to said flange, and a bearing positioned in said hub portion and rotatably supporting said shaft.

3. A dynamoelectric machine comprising a rotor member mounted on a shaft, a stator member mounted within a cylindrical shell member, said shell member having a portion extending beyond said rotor and stator members and defining an end cavity, said shell member portion having an inwardly turned flange formed at its end, said flange being inclined away from said rotor and stator members, an end shield member for said machine having a hub portion formed thereon extending into said cavity, said end shield member being inclined towards said rotor and stator members and having its outer periphery secured to said flange, and a bearing positioned in said hub portion and rotatably seating said shaft.

4. A dynamoelectric machine comprising a rotor member mounted on a shaft, a stator member mounted within a cylindrical shell member, said shell member having a portion extending beyond said rotor and stator members defining an end cavity, said shell member portion having an inwardly turned flange formed at its end, said flange being inclined away from said rotor and stator members and being frusto-spherical in configuration with its radius extending from a point along the center line of said shaft, an end shield member for said machine having a hub portion formed thereon extending into said cavity, said end shield member having a spherical configuration with its radius extending from a point along the center line of said shaft and having its outer periphery secured to said flange, and a bearing positioned in said hub portion and rotatably seating said shaft.

5. A dynamoelectric machine comprising a rotor member mounted on a shaft, a stator member mounted within a cylindrical shell member, said shell member having a portion extending beyond said rotor and stator members defining an end cavity, said shell member portion having an inwardly turned flange formed at its end, said flange being inclined away from said rotor and stator members and being frusto-spherical in configuration with its radius extending from a point along the center line of said shaft on the side of said rotor and stator members remote from said cavity, an end shield member for said machine having a hub portion formed thereon extending into said cavity, said end shield member having a spherical configuration with its radius extending from a point along the center line of said shaft on the side of said rotor and stator members remote from said cavity and having its outer periphery secured to said flange, and a bearing positioned in said hub portion and rotatably seating said shaft.

6. A dynamoelectric machine comprising a rotor member mounted on a shaft, a stator member mounted within a cylindrical shell member, said shell member having a portion extending beyond said rotor and stator member defining an end cavity, said shell member portion having an inwardly turned flange formed at its end, said flange being inclined away from said rotor and stator member and being frusto-spherical in configuration with its radius extending from a point along the center line of said shaft on the side of said rotor and stator members remote from said cavity, an end shield member for said machine having a hub portion formed thereon extending into said cavity, said end shield member having a spherical configuration with the same radius as said flange and having its outer periphery secured to said flange, and a bearing positioned in said hub portion and rotatably seating said shaft.

7. A dynamoelectric machine comprising a rotor member mounted on a shaft, a stator member mounted within a cylindrical shell member, said shell member having a portion extending beyond said rotor and stator members defining an end cavity, said shell member portion having an inwardly turned arcuate flange formed at its end, an end shield member for said machine having a hub portion formed thereon extending into said cavity, said end shield member having its outer periphery secured to the outer surface of said flange and having an opening formed therein communicating with said cavity for admitting ventilating air to the interior of said machine, a baffle member in said cavity secured to the inner surface of said flange, and a bearing positioned in said hub portion and rotatably seating said shaft.

8. A dynamoelectric machine comprising a rotor member mounted on a shaft, a stator member mounted within a cylindrical shell member, said shell member having a portion extending beyond said rotor and stator members defining an end cavity, said shell member portion having an inwardly turned arcuate flange formed at an end thereof, an end shield member for said machine having a hub portion formed thereon extending into said cavity, said end shield member having its outer periphery parallel to and secured to said flange, and a bearing assembly positioned in said hub portion so as to be substantially integral therewith and comprising a bearing sleeve rotatably seating said shaft and having an opening therein intermediate the ends thereof communicating with the journal surface of said shaft, said sleeve having a plurality of radially extending projections formed adjacent each end thereof, an outer cylindrical casing member positioned over said projections engaging said hub portion and defining an annular lubricant reservoir with said sleeve, and lubricant absorbent material positioned in said reservoir.

9. A dynamoelectric machine comprising a rotor member mounted on a shaft, a stator member mounted within a cylindrical shell member, said shell member having a portion extending beyond said rotor and stator members defining an end cavity, said shell member portion having an inwardly turned arcuate flanged portion formed at its end, an end shield member for said machine having a hub portion formed thereon extending into said cavity, said end shield member having its outer periphery parallel to and secured to said flange, and a bearing assembly positioned in said hub portion so as to be substantially integral therewith and comprising a bearing sleeve rotatably seating said shaft and having an opening therein intermediate the ends thereof communicating with the journal surface of said shaft, a pair of members each having a plurality of radial spokes respectively positioned adjacent each end of sleeve, an outer cylindrical casing member positioned over said spokes engaging said hub portion and defining an annular lubricant reservoir with said sleeve, lubricant absorbent material in said reservoir, and lubricant slinging devices respectively arranged on said shaft at the outer ends of said bearing and in said reservoir for returning lubricant to said absorbent material which passes along said shaft.

10. A dynamoelectric machine comprising a rotor member mounted on a shaft, a stator member mounted within a cylindrical shell member, said shell member having a portion extending beyond said rotor and stator members defining an end cavity, said shell member portion having an inwardly turned flange formed at its end, said flange being inclined away from such rotor and stator members and being frusto-spherical in configuration with its radius extending from a point along the center line of said shaft, an end shield member for said machine having hub portion formed thereon extending into said cavity, said end shield member having a spherical configuration with its radius extending from a point along the center line of said shaft, said end shield member having its outer periphery secured to said flange, and a bearing assembly positioned in said hub portion comprising a bearing sleeve rotatably seating said shaft and having an opening therein intermediate the ends thereof communicating with the journal surface of the shaft, said sleeve having a plurality of radially extending projections formed adjacent each end thereof, an outer cylindrical casing member positioned over said projections engaging said hub portion and defining annular lubricant reservoir with said sleeve, and lubricant absorbent material positioned in said reservoir.

11. A dynamoelectric machine comprising rotor member mounted on a shaft, a stator member mounted within a cylindrical shell member, said shell member having a portion extending beyond said rotor and stator members defining an end cavity, said sleeve member portion having an inwardly turned flange formed at its end, said flange being inclined away from said rotor and stator members and being frusto-spherical in configuration with its radius extending from a point along the center line of said shaft on the side of said rotor and stator members remote from said cavity, an end shield member for said machine having a hub portion formed thereon extending into said cavity, said end shield member having a spherical configuration with the same radius as said flange, said end shield member having its outer periphery secured to the outer surface of said flange and having an opening formed therein communicating with said cavity for admitting ventilating air into the interior of said machine, a baffle member in said cavity secured to the inner surface of said flange, and a bearing assembly positioned in said hub portion comprising a bearing sleeve rotatably seating said shaft and having an opening therein intermediate the ends thereof communicating with the journal surface of the shaft, a pair of members each having a plurality of radially extending spokes respectively positioned adjacent each end of said sleeve, an outer cylindrical casing member positioned over said spokes engaging said hub portion and defining an annular lubricant reservoir with said sleeve, lubricant absorbent material positioned in said reservoir, and lubricant slinging devices respectively arranged on said shaft at either end of said bearing and in said reservoir for returning lubricant to said absorbent material which passes along said shaft.

12. In combination with a rotatable shaft, a bearing assembly comprising a bearing sleeve rotatably seating said shaft and having an opening therein intermediate the ends thereof communicating with the journal surface of said shaft, a pair of members each having a plurality of radially extending spokes respectively positioned adjacent each end of said sleeve, an outer cylindrical member positioned over said spokes defining an annular lubricant reservoir with said sleeve, lubricant absorbent material positioned in said reservoir, and lubricant slinging devices respectively arranged on said shaft at either end of said bearing and in said reservoir for returning lubricant to said absorbent material which passes along said shaft.

References Cited in the file of this patent

UNITED STATES PATENTS

| Number | Name | Date |
| --- | --- | --- |
| 707,842 | Hawkins et al. | Aug. 26, 1902 |
| 1,428,889 | Johnson | Sept. 12, 1922 |
| 1,631,962 | Hemleb | June 14, 1927 |
| 2,590,525 | Esary | Mar. 25, 1952 |